US012675030B2

(12) United States Patent
Jakubowski et al.

(10) Patent No.: US 12,675,030 B2
(45) Date of Patent: Jul. 7, 2026

(54) MEDIA HUB SYSTEMS AND METHODS

(71) Applicant: Peloton Interactive, Inc., New York, NY (US)

(72) Inventors: Richard Jakubowski, New York, NY (US); Juan Ernesto Jimenez, New York, NY (US); Heidi Serene Farrell, New York, NY (US); Benjamin G. Schultz, New York, NY (US); Hsiao-yu Yu, New York, NY (US); Kevin Wayin Kan, New York, NY (US); Trevor John Timson, New York, NY (US); Thomas Cortese, New York, NY (US); Blake David Chasen, New York, NY (US)

(73) Assignee: Peloton Interactive, Inc., New York, NY (US)

( * ) Notice: Subject to any disclaimer, the term of this patent is extended or adjusted under 35 U.S.C. 154(b) by 117 days.

(21) Appl. No.: 18/264,357

(22) PCT Filed: Feb. 4, 2022

(86) PCT No.: PCT/US2022/015233
§ 371 (c)(1),
(2) Date: Aug. 4, 2023

(87) PCT Pub. No.: WO2022/170042
PCT Pub. Date: Aug. 11, 2022

(65) Prior Publication Data
US 2024/0118593 A1 Apr. 11, 2024

Related U.S. Application Data

(60) Provisional application No. 63/146,437, filed on Feb. 5, 2021.

(51) Int. Cl.
*G03B 17/56* (2021.01)
*F16M 11/04* (2006.01)
(Continued)

(52) U.S. Cl.
CPC ......... *G03B 17/561* (2013.01); *F16M 11/041* (2013.01); *F16M 11/10* (2013.01);
(Continued)

(58) Field of Classification Search
CPC .... H04N 7/183; H04N 23/695; H04N 23/661; H04N 23/52; H04N 23/51; H04N 7/18;
(Continued)

(56) References Cited

U.S. PATENT DOCUMENTS

| | | | |
|---|---|---|---|
| 10,440,327 | B1 | 10/2019 | Bytyqi |
| 2007/0009113 | A1 | 1/2007 | Kenoyer |

(Continued)

FOREIGN PATENT DOCUMENTS

WO 2009020333 A1 2/2009

OTHER PUBLICATIONS

International Search Report and Written Opinion dated Jun. 15, 2022 for International Application No. PCT/US2022/015233.
(Continued)

*Primary Examiner* — Xi Wang
(74) *Attorney, Agent, or Firm* — AMPACC Law Group, PLLC

(57) ABSTRACT

Media hub systems and methods for providing content for display on a device provided. The media system may include a hub and a mount configured to secure the hub to a plurality of structures. The hub may include a camera and be configured to provide content for display on a device. The mount may be configured to couple to the hub via a magnetic connection. The magnetic connection may be configured to
(Continued)

allow the hub to tilt relative to the mount to adjust a field-of-view of the camera.

16 Claims, 17 Drawing Sheets

(51) Int. Cl.

| | |
|---|---|
| *F16M 11/10* | (2006.01) |
| *F16M 13/02* | (2006.01) |
| *G03B 17/55* | (2021.01) |
| *H04N 7/18* | (2006.01) |
| *H04N 23/51* | (2023.01) |
| *H04N 23/52* | (2023.01) |
| *H04N 23/57* | (2023.01) |
| *H04N 23/661* | (2023.01) |
| *H04N 23/695* | (2023.01) |

(52) U.S. Cl.
CPC ........... *F16M 13/022* (2013.01); *G03B 17/55* (2013.01); *H04N 7/18* (2013.01); *H04N 23/51* (2023.01); *H04N 23/52* (2023.01); *H04N 23/57* (2023.01); *H04N 23/661* (2023.01); *H04N 23/695* (2023.01); *F16M 2200/027* (2013.01)

(58) Field of Classification Search
CPC .. H04N 5/2253; H04N 5/2254; H04N 5/2252; F16M 2200/027; G03B 17/561; G03B 17/55
See application file for complete search history.

(56)                References Cited

U.S. PATENT DOCUMENTS

| | | | | |
|---|---|---|---|---|
| 2011/0085016 | A1 | 4/2011 | Kristiansen | |
| 2015/0071465 | A1* | 3/2015 | Zalisk | G08C 17/00 |
| | | | | 74/504 |
| 2015/0345699 | A1* | 12/2015 | Manniche | F16C 11/0623 |
| | | | | 73/866.5 |
| 2016/0127643 | A1 | 5/2016 | Huerta | |
| 2017/0011210 | A1* | 1/2017 | Cheong | A61B 5/681 |
| 2018/0013271 | A1 | 1/2018 | Goulden | |
| 2018/0013272 | A1* | 1/2018 | Germe | H02G 3/0437 |
| 2019/0023194 | A1* | 1/2019 | Ghannam | H04N 23/57 |
| 2020/0033697 | A1 | 1/2020 | Rami | |
| 2020/0096842 | A1 | 3/2020 | Ramones | |

OTHER PUBLICATIONS

European Examination Report dated Jul. 31, 2025 for European Patent Application No. 22707924.1.

* cited by examiner

100

108
102

104

1200

100

102

104
1600
1608
1602
1200

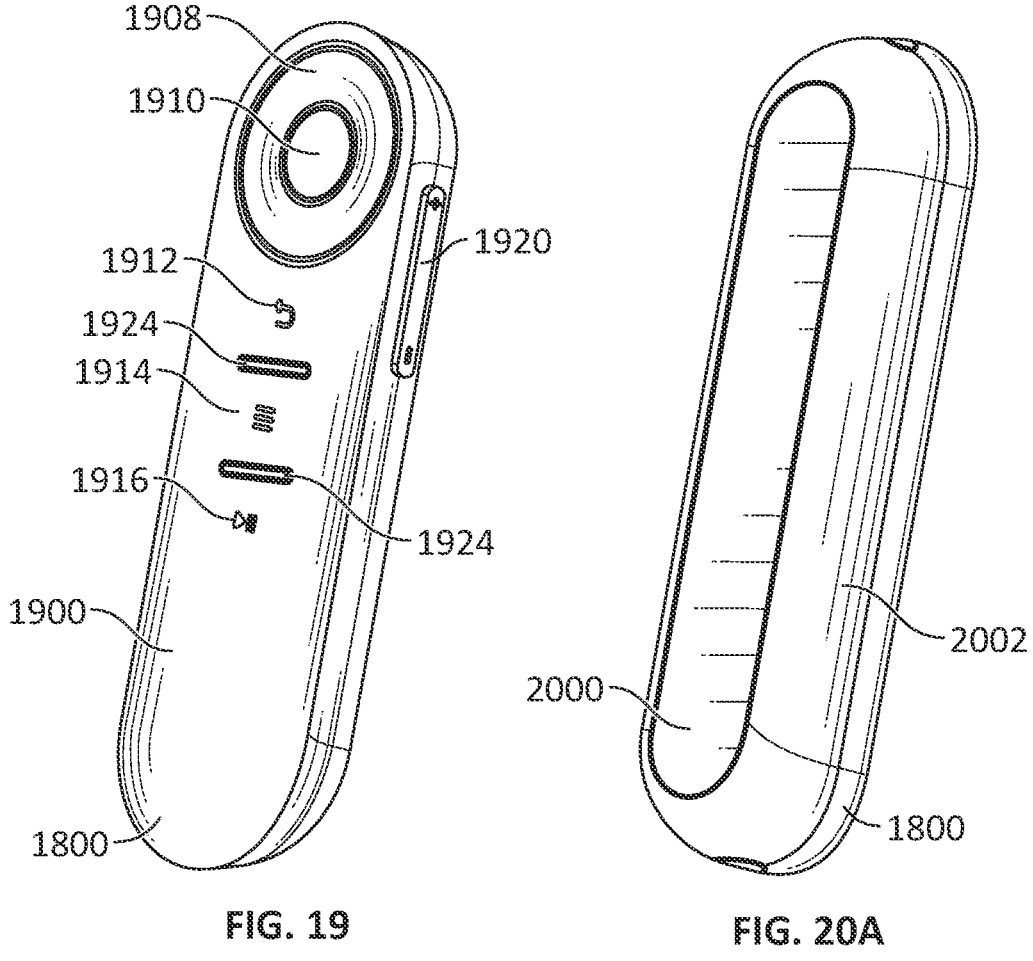
FIG. 19                    FIG. 20A

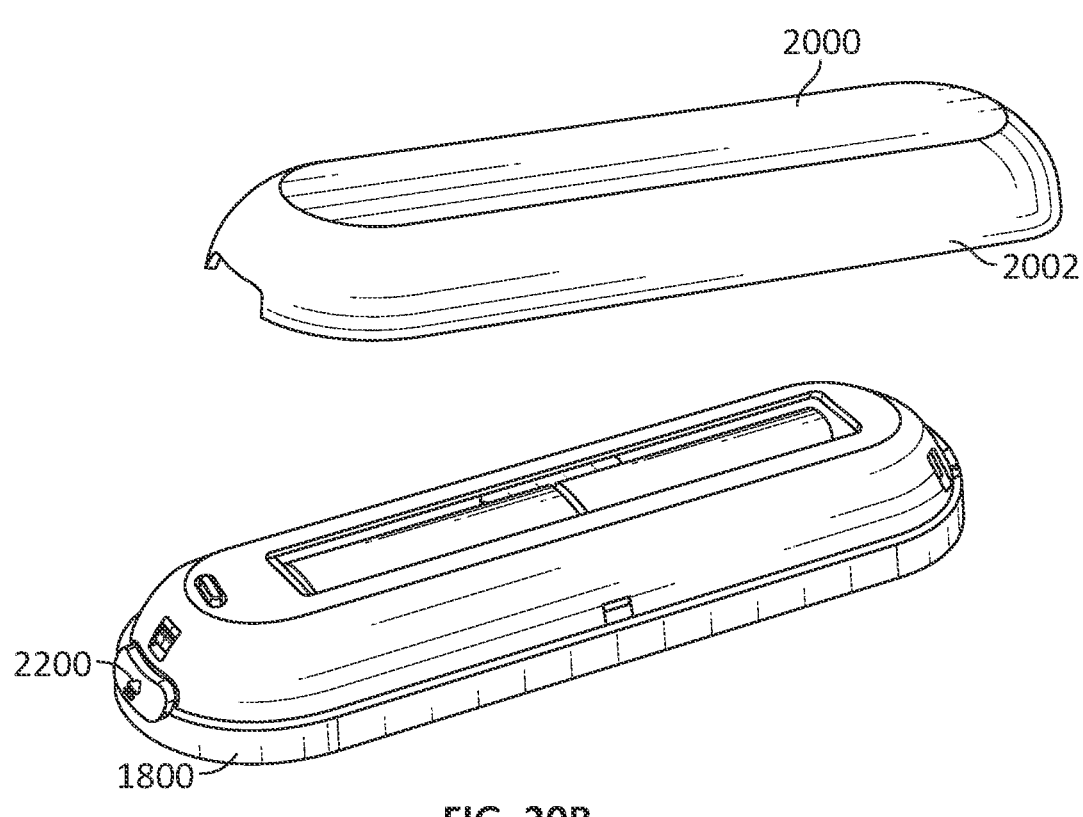
FIG. 20B
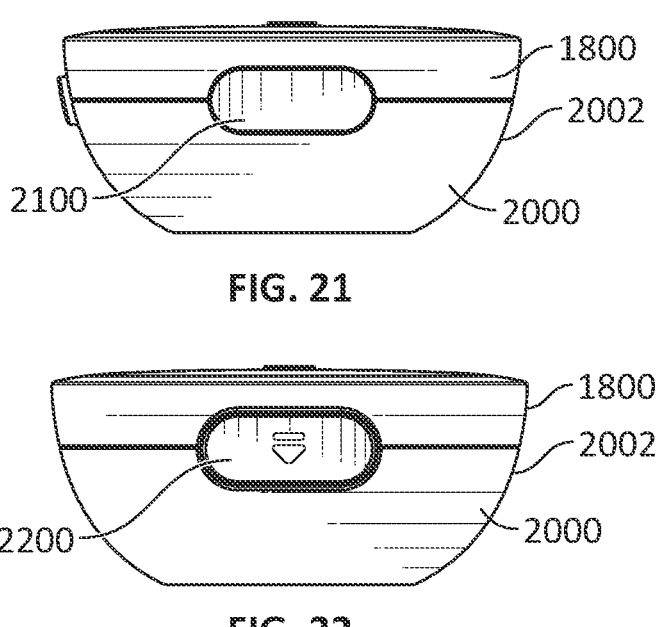
FIG. 21
FIG. 22

2500

2502
Couple a hub to a mount

2504
Secure the hub to one of a plurality of structures via the mount

2506
Selectively cover a camera of the hub with a slider

2508
Tilt the hub relative to the mount to adjust a field-of-view of the camera

2510
Operate the hub using a remote

MEDIA HUB SYSTEMS AND METHODS

CROSS-REFERENCE TO RELATED APPLICATIONS

The present application is a national stage entry of International Application No. PCT/US2022/015233, filed Feb. 4, 2022, which claims priority to U.S. Provisional Patent Application No. 63/146,437 filed Feb. 5, 2021, which are hereby incorporated by reference in their entirety.

TECHNICAL FIELD

One or more embodiments relate generally to media hubs and, more particularly, to systems and methods for providing content for display on a device via a hub that is coupled to a mount.

BACKGROUND

Media systems or "set top boxes" often include a hub configured to output video signals for display on a TV. The hub is often bulky and/or may include a stand integrated with the hub. Some hubs and/or stands make it difficult to secure the hub in position. Some content providers may require or encourage use of a separate camera (e.g., a web camera) to capture user actions.

Therefore, there is a need in the art for systems and methods that address the deficiencies noted above, other deficiencies known in the industry, or at least offers an alternative to current techniques.

SUMMARY

Systems and methods are provided for a media hub that provides (e.g., streams, downloads, uploads, etc.) content, such as for display on a device, via a hub that is coupled to a mount, such as magnetically coupled to the mount. According to one or more embodiments of the present disclosure, a media system is provided. The media system may include a hub and a mount configured to secure the hub to a plurality of structures. The hub may include a camera and be configured to provide content for display on a device. The mount may be configured to couple to the hub via a magnetic connection. The magnetic connection may be configured to allow the hub to tilt relative to the mount to adjust a field-of-view of the camera.

According to one or more embodiments of the present disclosure, a hub configured to stream content for display on a device is provided. The hub may include a camera configured to capture user actions, a recess configured to receive at least a portion of a mount, and a bracket positioned adjacent to the recess and configured to magnetically interface with a magnet of the mount to magnetically couple the hub to the mount. The recess may be shaped to allow tilting of the hub relative to the mount to adjust a field-of-view of the camera.

According to one or more embodiments of the present disclosure, a method is provided. The method may include coupling a hub to a mount via a magnetic connection and securing the hub to a structure via the mount. The hub may include a camera and be configured to provide digital content for display on a device. The magnetic connection may allow the hub to tilt relative to the mount to adjust a field-of-view of the camera. The mount may be reconfigurable to secure the hub to a plurality of structures.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the seat assembly described herein and should not be construed as a complete depiction of the scope of the seat assembly.

FIG. 19 illustrates a top perspective view of a remote of the media system, in accordance with an embodiment of the disclosure.

FIG. 20A illustrates a bottom perspective view of the remote, in accordance with an embodiment of the disclosure.

FIG. 20B illustrates a bottom perspective view of the remote with a battery door removed for illustration purposes, in accordance with an embodiment of the disclosure.

FIG. 21 illustrates a front view of the remote, in accordance with an embodiment of the disclosure.

FIG. 22 illustrates a rear view of the remote, in accordance with an embodiment of the disclosure.

Embodiments of the disclosure and their advantages are best understood by referring to the detailed description that follows. It should be appreciated that like reference numerals may be used to identify like elements illustrated in one or more of the figures.

DETAILED DESCRIPTION

According to the present disclosure, media hub systems and methods are provided. The media system includes a hub configured to provide content for display on a device, and a mount configured to secure the hub to various structures or devices. The hub includes a camera configured to capture user actions or other images. The mount is configured to couple to the hub, such as via a magnetic connection, for example. The connection (e.g., the magnetic connection) is designed such that the hub can tilt up and down relative to the mount to adjust a field-of-view of the camera. The hub may include a slider configured to selectively cover the camera as desired, such as for privacy.

Figures 1, 2:
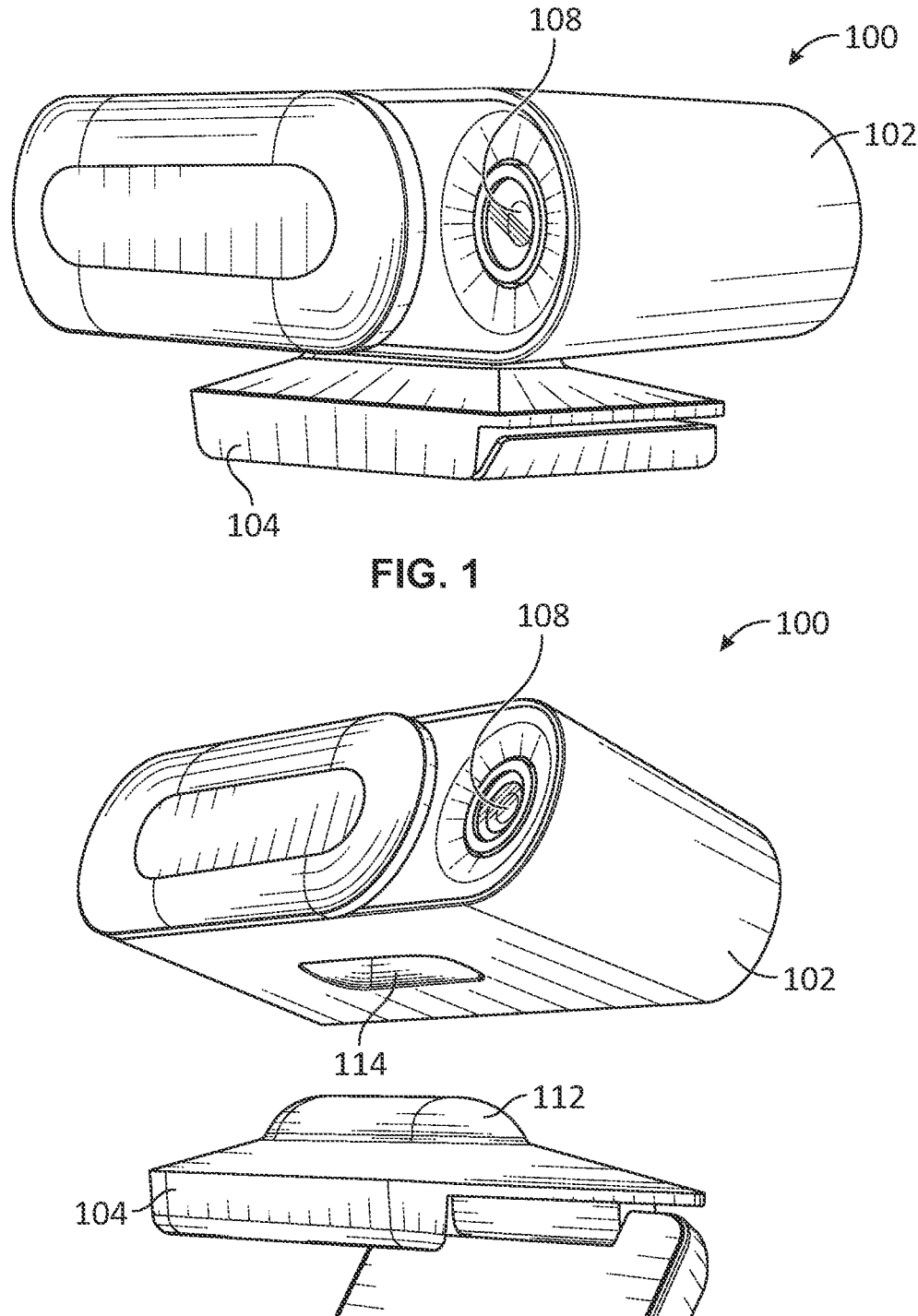
FIG. 1 illustrates a perspective view of a media system, in accordance with an embodiment of the disclosure.
FIG. 2 illustrates a partially exploded view of the media system of FIG. 1, in accordance with an embodiment of the disclosure.

FIG. 1 illustrates a perspective view of a media system, in accordance with an embodiment of the disclosure. FIG. 2 illustrates a partially exploded view of the media system, in accordance with an embodiment of the disclosure. Referring to FIGS. 1-2, a media system 100 is provided. The media system 100 may generally be a device (e.g., an information appliance device) operable to receive one or more external source signals or other data and convert or otherwise provide content in a form that can then be displayed on a display device (e.g., a television, a laptop, a monitor, a tablet, etc.). For example, the media system 100 may be able to stream content to a display device from one or more applications running on the media system 100 or another connected device. In embodiments, the media system 100 may be configured to convert video content to analog or digital signals (e.g., TV signals, etc.) for display on a display device. In embodiments, the media system 100 may connect to a network (e.g., a wireless network, a wired network, a local area network (LAN), a wide area network (WAN), a virtual private network (VPN, a personal area network (PAN), etc.) for Internet access and convert video from one or more providers into digital or analog signals. The media system 100 may provide bi-directional data communication with a network. For example, the media system 100 may upload data (e.g., workout data, settings, user preferences, media system status, etc.) to a network (e.g., to the cloud) or another connected device. In this way, the media system 100 may be configured to both receive and transmit information. In embodiments, the media system 100 may be referred to as a set top box, a media receiver, or the like.

Depending on the application, the media system 100 may be associated with an exercise or fitness provider or application. For example, the media system 100 may be used to stream various exercise or fitness videos, classes, instructions, or other data for display on a display device. As explained more fully below, the media system 100 may be configured to track or monitor a user in relation to the exercise or fitness videos, classes, or instructions. For example, the media system 100 may be used to determine whether a user has completed an exercise, move, or program, as instructed or shown.

The media system 100 may include multiple components facilitating operation. For example, as shown, the media system 100 includes a hub 102 and a mount 104 configured to secure and/or support the hub 102 during operation. As shown, the hub 102 includes a camera 108 and is configured to provide content (e.g., digital content) for display on a device. The hub 102, which may be referred to as a media hub, may include all the hardware, software, and connections necessary for operation of the media system 100 (e.g., receiving one or more signals, converting the signals as appropriate for display on a display device, capturing one or more images from the camera 108, etc.).

The mount 104, which may be referred to as a stand, may be configured to secure the hub 102 to a structure. For example, the mount 104 may support the hub 102 on a flat, or nearly flat, surface, on top of a display device (e.g., on top of a TV), or on other structures/surfaces. In this regard, the mount 104 may be configurable based on the surface or structure to which the hub 102 is to be mounted. For instance, the mount 104 may be configured in a first, flat configuration (see FIG. 1) to support the hub 102 on a flat surface. As shown in FIG. 2, the mount 104 may be configured in a second configuration allowing the hub 102 to be supported on the top of a TV or other display device, as detailed more fully below.

With continued reference to FIG. 2, the mount 104 may be releasably coupled to the hub 102. For example, the mount 104 may magnetically connect to the hub 102, although other configurations are contemplated, such as non-magnetic connections, etc. The magnetic connection between the hub 102 and the mount 104 may hold the hub 102 in place and limit undesired decoupling of the hub 102 from the mount 104. In embodiments, the hub 102 and mount 104 may include complementary structures to facilitate attachment of the hub 102 to the mount 104 at the magnet connection. For example, the mount 104 may include a protrusion 112, and the hub 102 may include a recess 114 configured to receive at least a portion of the protrusion 112 to magnetically couple the hub 102 to the mount 104. The protrusion 112, which may be referred to as a bulb, may protrude into the recess 114 of the hub 102 to couple the mount 104 to the hub 102. As shown, the protrusion 112 and recess 114 may have complementary pill-shapes, although other shapes or configurations are contemplated consistent with the present disclosure.

Figures 3, 4:
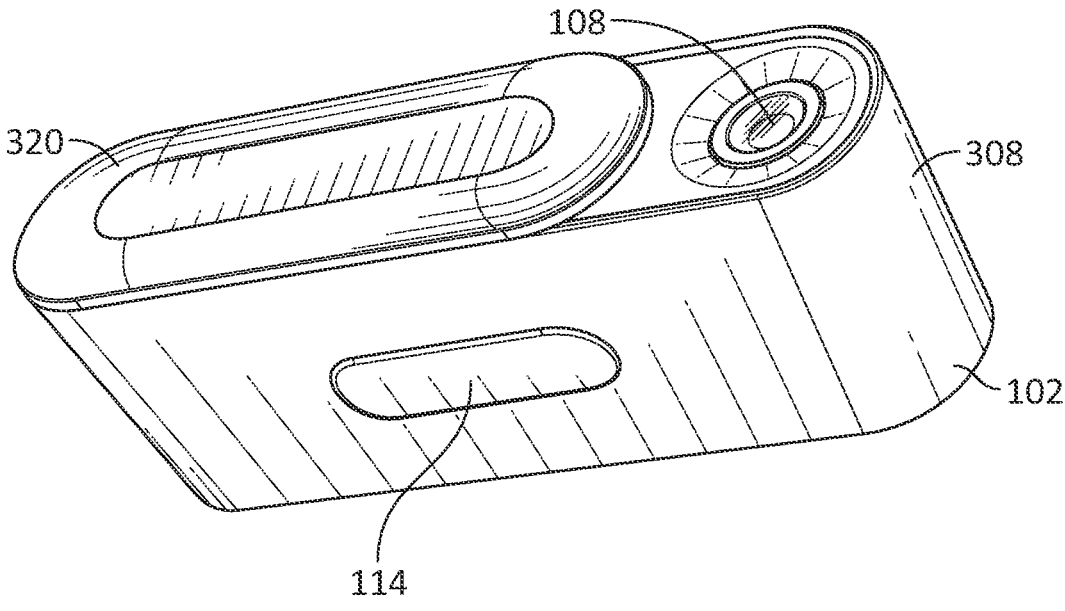
FIG. 3 illustrates a bottom perspective view of a hub of the media system, in accordance with an embodiment of the disclosure.
FIG. 4 illustrates a rear perspective view of the hub, in accordance with an embodiment of the disclosure.

FIG. 3 illustrates a bottom perspective view of the hub 102, in accordance with an embodiment of the disclosure. FIG. 4 illustrates a rear perspective view of the hub 102, in accordance with an embodiment of the disclosure. Referring to FIGS. 3-4, the hub 102 may include a top, a bottom, and sides that are wrapped with a fabric 308 or other textile material. The fabric 308 may provide one or more functional characteristics. For instance, the fabric 308 may protect a user from underlying metal surfaces in the event the underlying surface temperature rises during use. The fabric 308 may conceal one or more microphones or audio devices. Additionally, or alternatively, the fabric 308 may be configured to provide a desired aesthetic or feel to the hub 102. As shown in FIG. 3, the recess 114 may be disposed in the bottom of the hub 102 and interrupt the fabric 308. In embodiments, the recess 114 may be rubber coated to facilitate holding of the hub 102 as desired, as detailed below.

Referring to FIG. 3, the camera 108 may be disposed in the front of the hub 102, such as off-center near one of the sides of the hub 102. The camera 108 may be configured to capture user actions. For example, the camera 108 may be used to track or monitor user movement. For example, the camera 108 may capture images or video of user actions. In embodiments, the user actions may be displayed on the display device. The camera 108 may be a wide-angle camera having a wide field of view. The hub 102 may be sized and shaped to limit or prevent the hub 102 from being visible in the field of view of the camera 108. As shown, the hub 102 may include a slider 320 on the front of the hub 102, the slider 320 configured to selectively cover the camera 108 as desired. In this way, the slider 320 may be referred to as a privacy slider, with the user sliding the slider 320 over the camera 108 when privacy or disablement of certain features is desired.

Referring to FIG. 4, one or more features may be disposed on the rear of the hub 102. For example, the hub 102 may include mic switch 400. The mic switch 400 may be configured to selectively turn one or more microphones of the hub 102 on or off. The microphones may be configured to receive audio, such as one or more voice commands from the user. The mic switch 400 may be a sliding switch. Like slider 320, the user may turn the one or more microphones of when privacy or disablement of certain features is desired. In embodiments, the hub 102 may include a connector well 402 disposed in the rear of the hub 102. The connector well 402 may be configured to receive one or more cables for connection to the hub 102 (e.g., a connector of an HDMI cable, a connector of a USB cable, a connector of a USB-C cable, etc.). In embodiments, the connector well 402 may be sized and shaped such that ends of cable connectors sit flush or substantially flush with the rear of the hub 102 to facilitate placement of the hub 102 near a wall or other vertical surface.

Figure 5:
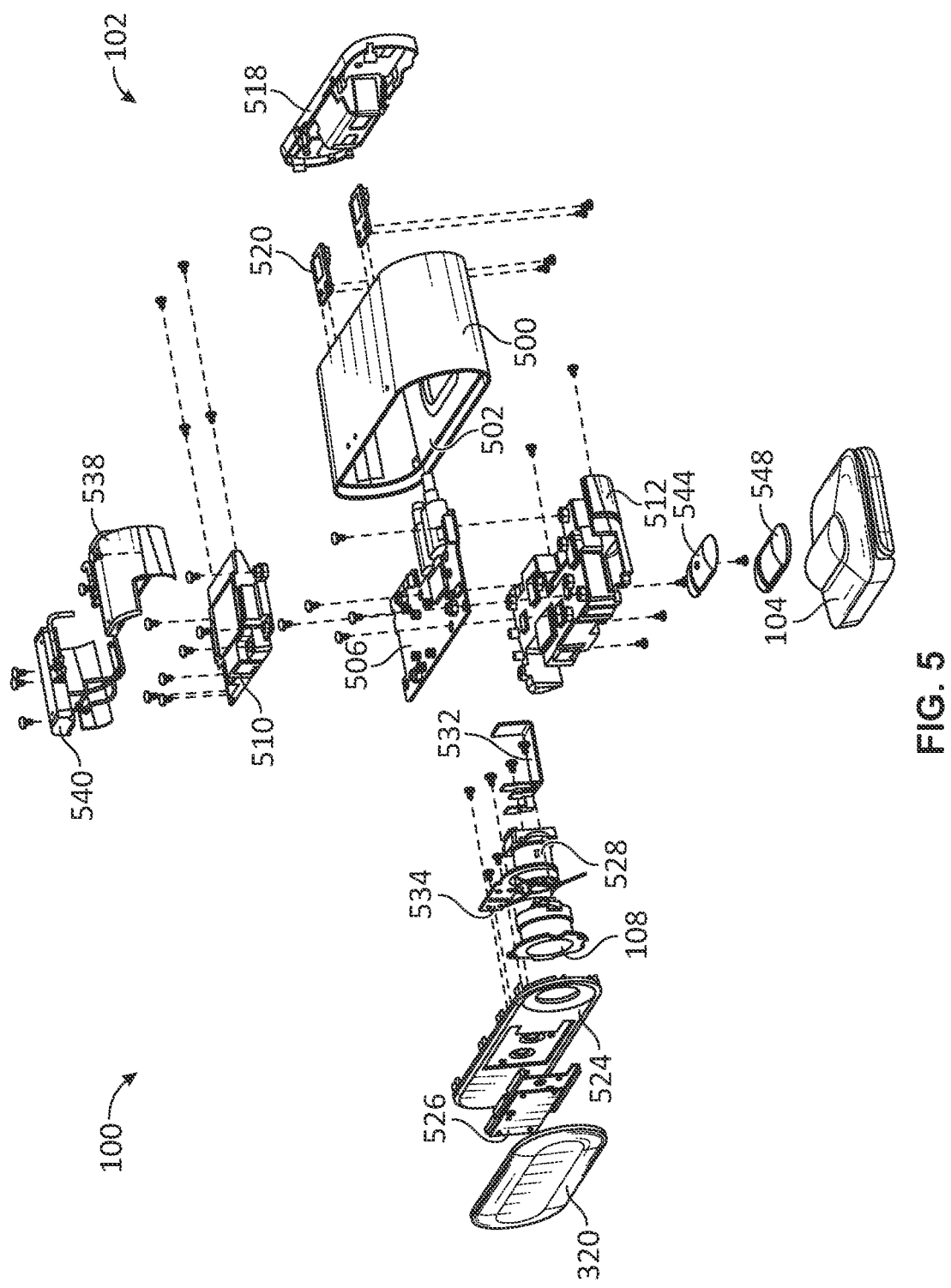
FIG. 5 illustrates an exploded view of the hub, in accordance with an embodiment of the disclosure.

FIG. 5 illustrates an exploded view of the hub 102, in accordance with an embodiment of the disclosure. Referring to FIG. 5, the hub 102 may include a sleeve 500 defining a structure that supports the various components of the hub 102. For example, the sleeve 500, which may be referred to as a housing, may define a cavity 502 in which one or more components are received and secured in place. As show % n, the hub 102 includes a circuit board 506 (e.g., a multi-layered board, a main board, etc.) including necessary memory, chipsets, processors, and circuitry. A first heat sink 510 (e.g., a top heat sink) may be coupled to the circuit board 506 to provide a first thermal management characteristic, such as for a first set of components of the hub 102. Similarly, a second heat sink 512 (e.g., a bottom heat sink) may be coupled to the circuit board 506 to provide a second thermal management characteristic, such as for a second set of components of the hub 102.

The rear of the sleeve 500 includes a rear cover 518 including, for example, the mic switch 400 and the connector well 402. One or more mic boards 520 may be disposed within the sleeve 500. For example, the mic boards 520 may be attached to an interior face of the top side of the sleeve 500. The mic boards 520 may be placed centrally within the sleeve 500, at the rear of the sleeve 500, or biased towards the front of the sleeve 500, although the mic boards 520 may be placed at other locations, as desired. The mic boards 520 may be configured to drive one or more microphones of the hub 102.

As shown, a front face 524 (or front panel) may be assembled to the front of the sleeve 500. A hinge or sliding mechanism 526 may be connected to the front face 524, with the slider 320 connected to the sliding mechanism 526. The camera 108 may be secured to the front face 524, such as via a camera holder 528. In embodiments, a camera bracket 532 may be connected to the camera 108. The camera bracket 532 may secure the camera 108 in place, although camera bracket 532 may be configured solely for other purposes, as detailed below. The hub 102 may include an LED board 534 configured to drive one or more LEDs of the hub 102.

With continued reference to FIG. 5, the hub 102 may include an antenna holder 538. The antenna holder 538 may be positioned above the first heat sink 510 and include one or more communication modules 540. The communication modules 540 may be configured for wireless communications. For example, the communication modules 540 may be configured to connect the hub 102 to a wireless network, wirelessly pair the hub 102 with one or more devices (e.g., a smartphone, a tablet, a TV, etc.), receive wireless broadband signals, or the like. In embodiments, element 540 may simply be a passive antenna and electrically connected to circuit board 506, where a communication module resides. As shown, a metal plate or bracket 544 may be secured within the sleeve 500, such as above the recess 114 disposed in the bottom of the hub 102. In such embodiments, the bracket 544 may interface with the mount 104 to magnetically couple the mount 104 to the hub 102. A rubber coating 548 may be applied to the bracket 544 in the recess 114 to provide a desired friction characteristic between the hub 102 and the mount 104.

Figure 6:
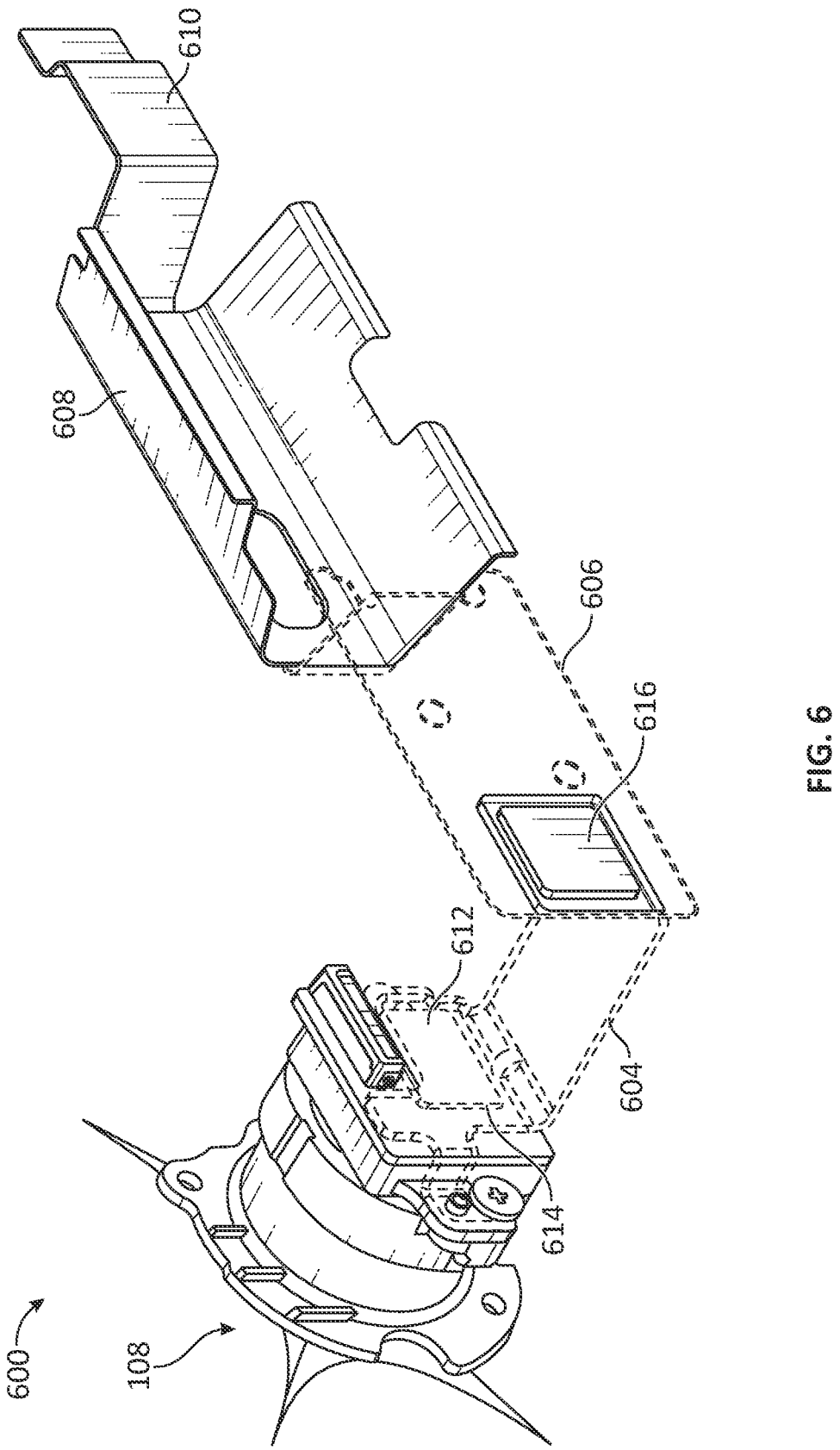
FIG. 6 illustrates a first thermal architecture associated with a camera of the hub, in accordance with an embodiment of the disclosure.

FIG. 6 illustrates a first thermal architecture 600 associated with the camera 108 of the hub 102, in accordance with an embodiment of the disclosure. The first thermal architecture 600 may be a thermal management solution designed to dissipate heat generated by the camera 108 during operation. The first thermal architecture 600 may provide a first pathway for dissipating heat from one or more heat generating elements of hub 102. For example, the first thermal architecture 600 may include one or more thermal pads, metal strips, or metal foils designed to draw heat away from the camera 108 to ensure full operation of the camera 108 under various conditions. Although described with reference to camera 108, the first thermal architecture 600 may be configured to dissipate heat generated by other components of the hub 102, such as any combination of the camera 108, circuit board 506, LED board 534, or communication modules 540, among others.

The first thermal architecture 600 may function in conjunction with the first heat sink 510 and/or the second heat sink 512. For instance, the first thermal architecture 600 may draw heat from the camera 108 (and/or another component of hub 102) to the first heat sink 510 and/or to the second heat sink 512, although other configurations are contemplated. For example, the first thermal architecture 600 may draw heat to another heat sink, or the first thermal architecture 600 may define a heat sink architecture itself. In embodiments, the first thermal architecture 600 may draw heat to the rear cover 518, such that the rear cover 518 is used as the major heat dissipation area for the first thermal architecture 600.

Referring to FIG. 6, the first thermal architecture 600 may include a plate 604 connected to the camera 108, a first foil 606 connected to the plate 604, a second foil 608 connected to the first foil 606, and a third foil 610 connected to the second foil 608. The plate 604, which may be the camera bracket 532 described above, may be a strip of metal, such as copper plate strip. The plate 604 may be 1 mm thick and secured to the camera 108 with one or more fasteners. As shown, an image sensor 612 may be coupled to the plate 604 via a first thermal gap pad 614. The first thermal gap pad 614 may be 0.8 mm thick at K=3 W/m-K, although other configurations are contemplated. The plate 604 may be coupled to the first foil 606 via a second thermal gap pad 616. The second thermal gap pad 616 may be 0.5 mm thick at K=6 W/m-K, although other configurations are contemplated.

Each of the first foil 606 and the second foil 608 may be a copper foil that is 0.3 mm thick. The third foil 610 may be an aluminum foil that is 0.12 mm thick. The foils may be shaped to fit around one or more adjacent components of hub 102, such as the circuit board 506, first heat sink 510, second heat sink 512, or any combination thereof for instance. The foils may be shaped to provide a desired architecture and surface area to dissipate heat effectively from the camera 108. In embodiments, the foils may be used as an electrostatic discharge solution and/or as an electromagnetic interference shield.

Figure 7:
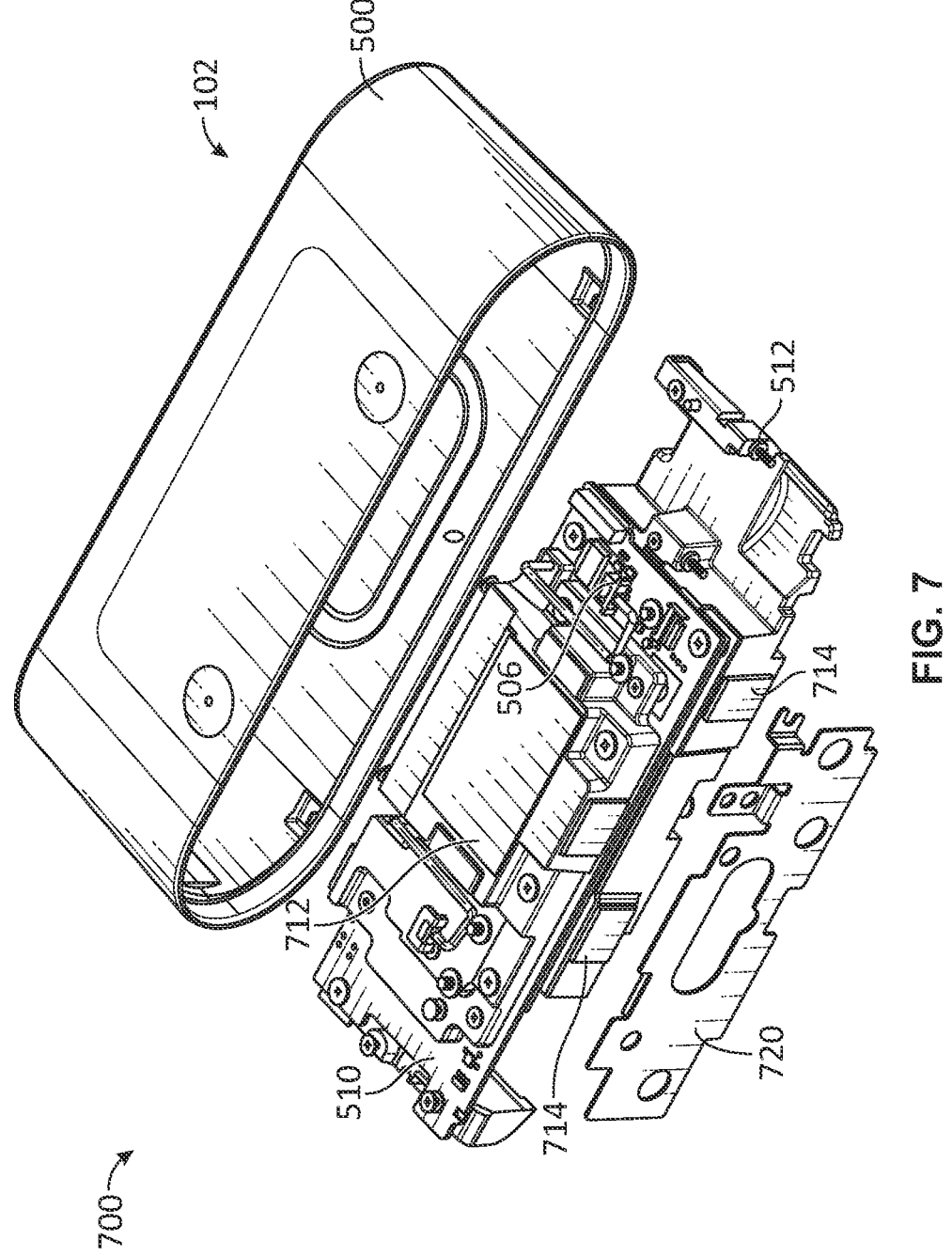
FIG. 7 illustrates a second thermal architecture associated with a circuit board of the hub, in accordance with an embodiment of the disclosure.

FIG. 7 illustrates a second thermal architecture 700 associated with the circuit board 506 of the hub 102, in accordance with an embodiment of the disclosure. The second thermal architecture 700 may be a thermal management solution designed to dissipate heat generated by the circuit board 506 (or the various components of the circuit board 506) during operation. The second thermal architecture 700 may provide a second pathway for dissipating heat from one or more heat generating elements of hub 102. For example, the second thermal architecture 700 may include one or more thermal pads, heat sinks, or metal foils/strips designed to draw heat away from the circuit board 506 to ensure full operation of the circuit board 506 under various conditions. Although described with reference to the circuit board 506, the second thermal architecture 700 may be configured to dissipate heat generated by other components of the hub 102, such as any combination of the camera 108, circuit board 506, LED board 534, or communication modules 540, among others.

The second thermal architecture 700 may function in conjunction with the first thermal architecture 600, the first heat sink 510, the second heat sink 512, and/or the sleeve 500. For example, the second thermal architecture 700 may draw heat from the circuit board 506 (and/or another component of hub 102) to the sleeve 500, which may be used as a major heat dissipation area, such as when the sleeve 500 is formed as an at least partial metal sleeve body (e.g., aluminum). In embodiments, the second thermal architecture 700 may be separate from the first thermal architecture 600 to keep the image sensor 612 separate from the main board system, such as to minimize temperature impact.

Referring to FIG. 7, the second thermal architecture 700 may include the first heat sink 510 and the second heat sink 512. As shown the circuit board 506 may be sandwiched between the first heat sink 510 and the second heat sink 512. The second thermal architecture 700 may include a third thermal gap pad 712 coupled to the first heat sink 510, such as to the top of the first heat sink 510. In embodiments, a fourth thermal gap pad 714 (e.g., a pair of fourth thermal gap pads 714) may be coupled to the second heat sink 512, such as to the front of the second heat sink 512. The third thermal gap pad 712 may fill the gap between the first heat sink 510 and the sleeve 500 at K=6 W/m-K, although other configurations are contemplated. The fourth thermal gap pad 714 may fill the gap between the second heat sink 512 and a foil connected between the first heat sink 510 and the second heat sink 512 (e.g., fourth foil 720). The third thermal gap pad 712 and/or fourth thermal gap pad 714 may fill the gaps between the heat sinks and the sleeve 500 and allow the core structure to slide into the sleeve 500 during assembly.

In embodiments, the second thermal architecture 700 may include a fourth foil 720. The fourth foil 720, which may be referred to as a front face foil and be a copper foil, may be connected to the first heat sink 510 and the second heat sink 512. The fourth foil 720 may dissipate heat between the first heat sink 510 and the second heat sink 514, such as to balance heat dissipation throughout the second thermal architecture 700. In embodiments, the fourth foil 720 may be used as an electrostatic discharge solution and/or as an electromagnetic interference shield.

Figure 8:
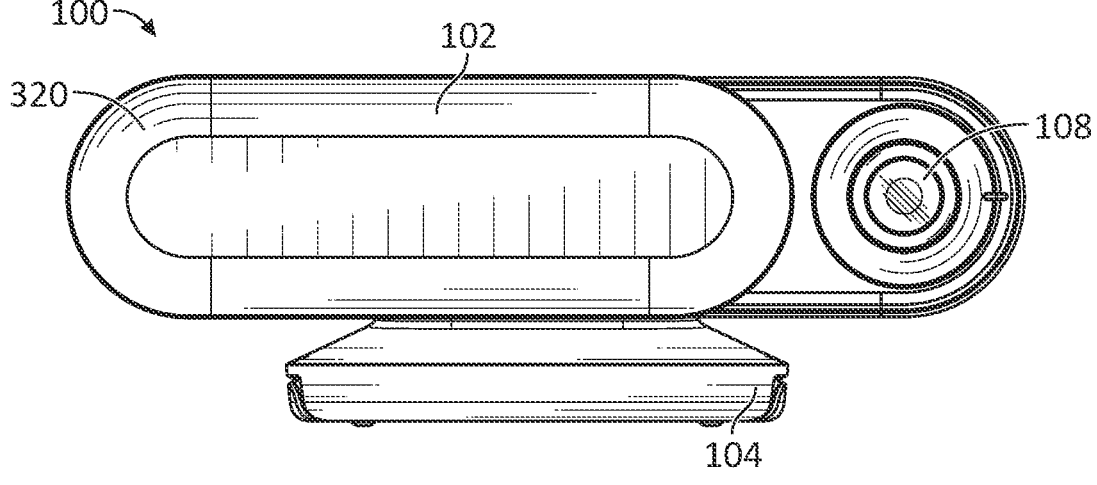
FIG. 8 illustrates a front view of the media system, with a slider of the hub in a first position to expose a camera of the hub, in accordance with an embodiment of the disclosure.
Figure 9:
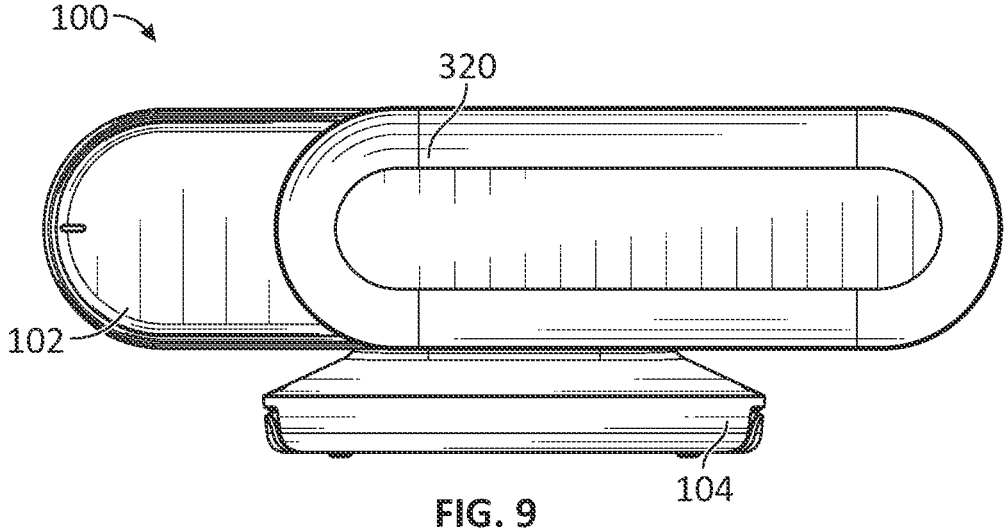
FIG. 9 illustrates a front view of the media system, with the slider of the hub in a second position to cover the camera, in accordance with an embodiment of the disclosure.

FIG. 8 illustrates a front view of the media system 100, with the slider 320 in a first position to expose the camera 108 of the hub 102, in accordance with an embodiment of the disclosure. FIG. 9 illustrates a front view of the media system 100, with the slider 320 in a second position to cover the camera 108, in accordance with an embodiment of the disclosure. Referring to FIGS. 8-9, the slider 320 may move from the first position to the second position to selectively cover the camera 108, such as for privacy, protection of camera 108, or the like. Similarly, the slider 320 may move from the second position to the first position to selectively expose the camera 108. In some embodiments, sliding the slider 320 from the first position to the second position may turn the hub 102 off or place the hub 102 in a suspended state (e.g., a sleep mode), and sliding the slider 320 from the second position to the first position may turn the hub 102 on or wake the hub 102 from a suspended state.

As shown, the slider 320 may be shaped to sit flush with one or more edges of the hub's housing or fabric 308 when in the first position and the second position. For example, as shown in FIG. 8, a left portion of the slider 320 may lie flush (or substantially flush) with a left portion of the hub's housing or fabric 308 when the slider 320 is positioned in the first position. As shown in FIG. 9, a right portion of the slider 320 may lie flush (or substantially flush) with a right portion of the hub's housing or fabric 308 when the slider 320 is positioned in the second position.

Figure 10:
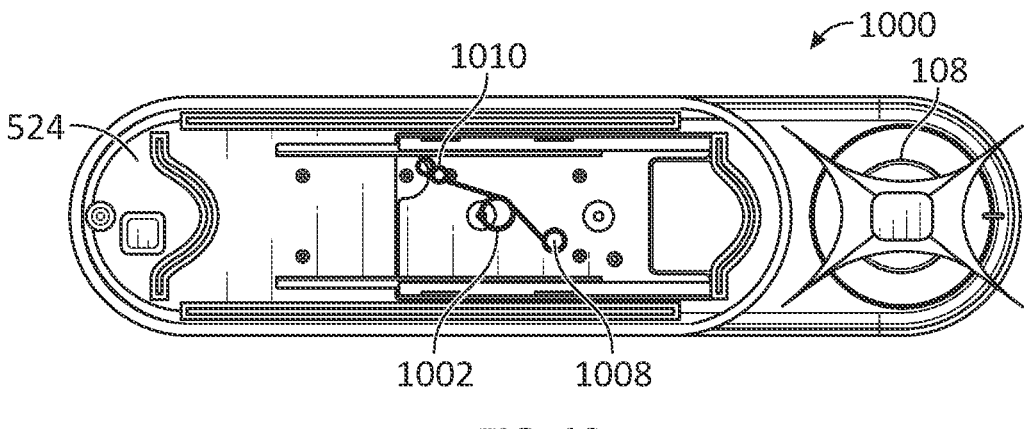
FIG. 10 illustrates a biasing mechanism of the hub, in accordance with an embodiment of the disclosure.

FIG. 10 illustrates a biasing mechanism 1000 of the hub 102, in accordance with an embodiment of the disclosure. Referring to FIGS. 8-10, the slider 320 may be biased to either the first position or the second position based on the position of the slider 320. For example, when positioned nearer the left side of hub 102, the slider 320 may be biased to the first position. When positioned nearer the right side of hub 102, the slider 320 may be biased to the second position. The biasing mechanism 1000 may include an over-center spring 1002 biasing the slider 320 to one of the first position or the second position based on the position of the slider 320. The spring 1002 may include a first end 1008 and a second end 1010. The first end 1008 may be coupled to the front face 524, and the second end 1010 may be coupled to the slider 320. The first end 1008 may be fixed such that the first end 1008 does not move with the slider 320. The second end 1010 may be captured on the slider 320, so the second end 1010 slides laterally as the slider 320 moves laterally between the first position and the second position.

The spring 1002 may snap the slider 320 to the first position or the second position. For example, the slider 320 may be slid from the first position to the second position until the spring 1002 goes "over center," at which point the spring 1002 may snap the slider 320 to the second position. Similarly, the slider 320 may be slid from the second position to the first position until the spring 1002 again goes "over center," at which point the spring 1002 may snap the slider 320 to the first position. If the spring 1002 does not go "over center," the spring 1002 may snap the slider 320 back into position (e.g., if the slider 320 is not slid a sufficient distance to go over center).

Figure 11:
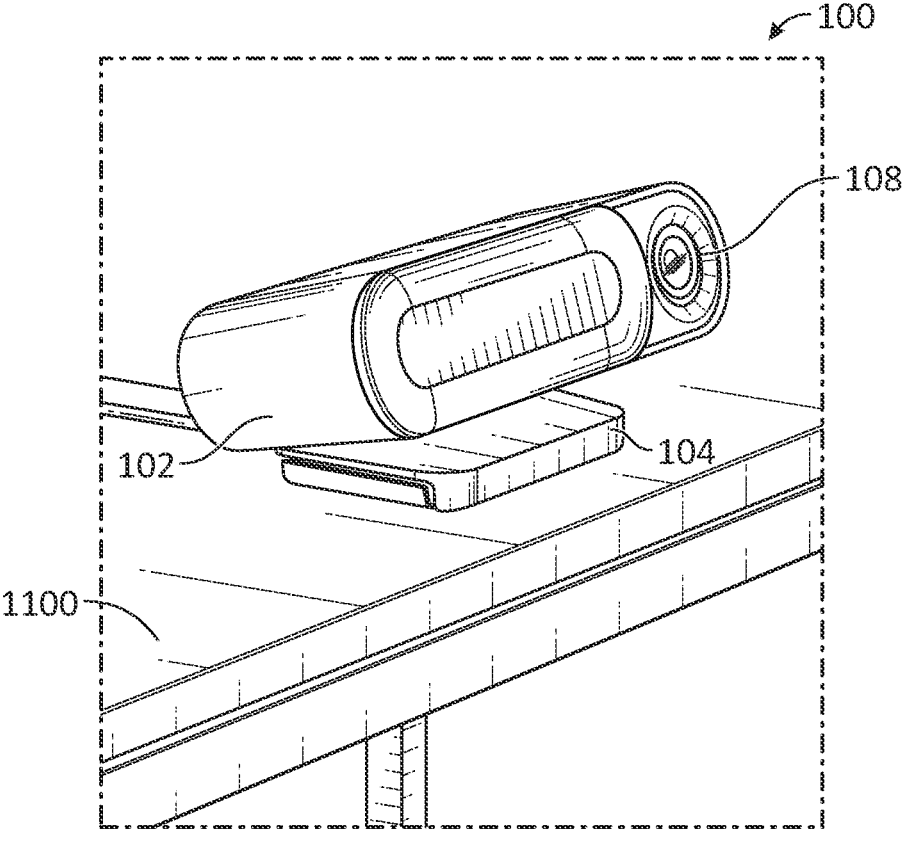
FIG. 11 illustrates the media system installed on a table-top, in accordance with an embodiment of the disclosure.
Figure 12A:
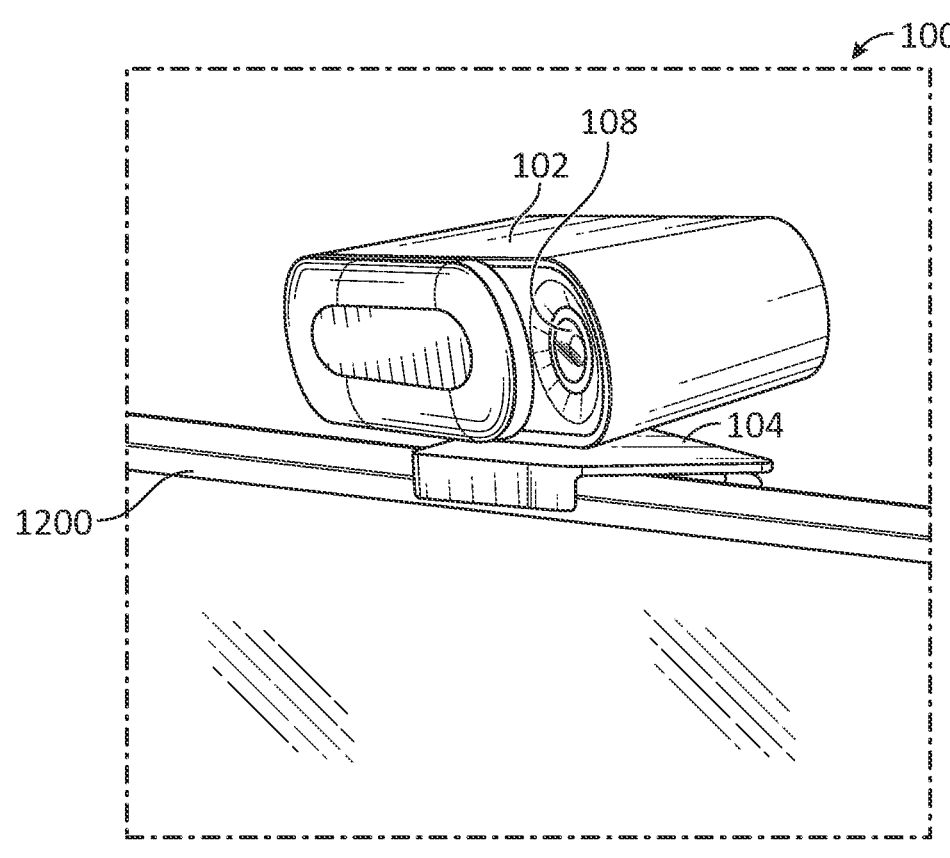
FIGS. 12A and 12B illustrate the media system installed on the top of a media device, in accordance with an embodiment of the disclosure.
Figure 12B:
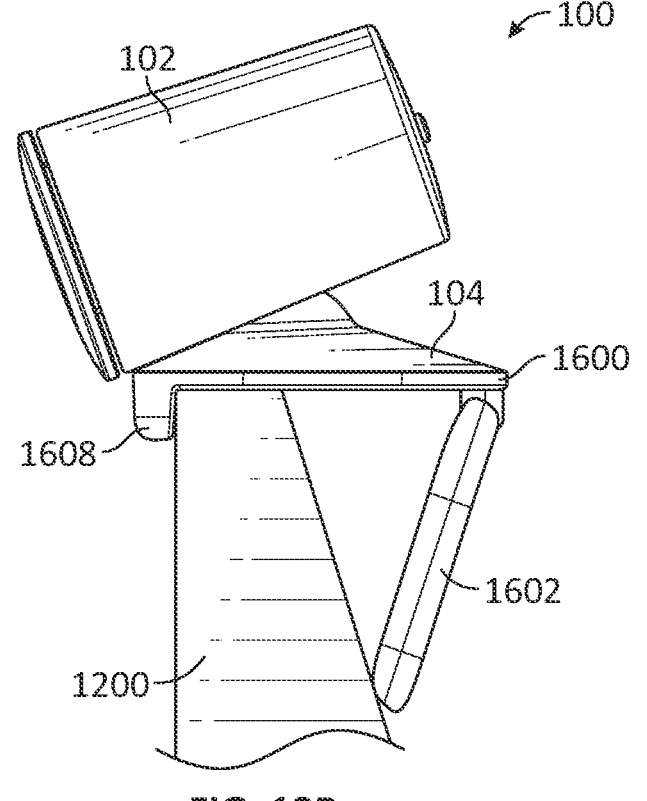

FIG. 11 illustrates the media system 100 installed on a tabletop, in accordance with an embodiment of the disclosure. FIGS. 12A and 12B illustrate the media system 100 installed on the top of a media device (e.g., a TV), in accordance with an embodiment of the disclosure. Referring to FIG. 11, the media system 100 may be configurable for placement on a tabletop 1100 or other flat surface. For instance, the mount 104 may be configured flat, and the hub 102 may be oriented to point the camera 108 upwards towards the user. For example, the hub 102 may be tilted upwards such that the user is in the field-of-view of the camera 108 when the media system 100 is positioned low (e.g., on a low tabletop 1100).

Referring to FIGS. 12A-12B, the media system 100 may be configurable for placement on a display device 1200 (e.g., a TV). Because the top of the display device 1200 may not be flat (or wide enough to support the entirety of the bottom of mount 104), the mount 104 may be configured to support the media system 100 on the narrow top edge of the display device 1200. As shown, the hub 102 may be oriented to point the camera 108 downwards towards the user. For instance, the hub 102 may be tilted downwards such that the user is in the field-of-view of the camera 108 when the media system 100 is positioned high (e.g., on top of the display device 1200).

Figure 13:
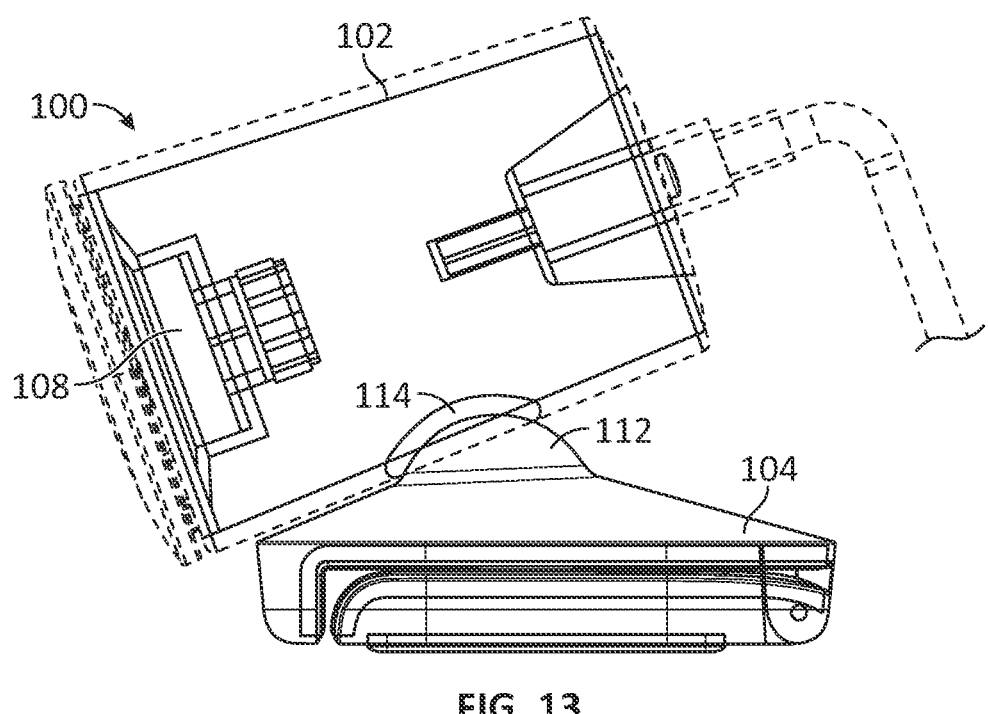
FIG. 13 illustrates the hub tilted downward relative to a mount of the media system, with portions of the media system shown transparent for illustration purposes, in accordance with an embodiment of the disclosure.
Figure 14:
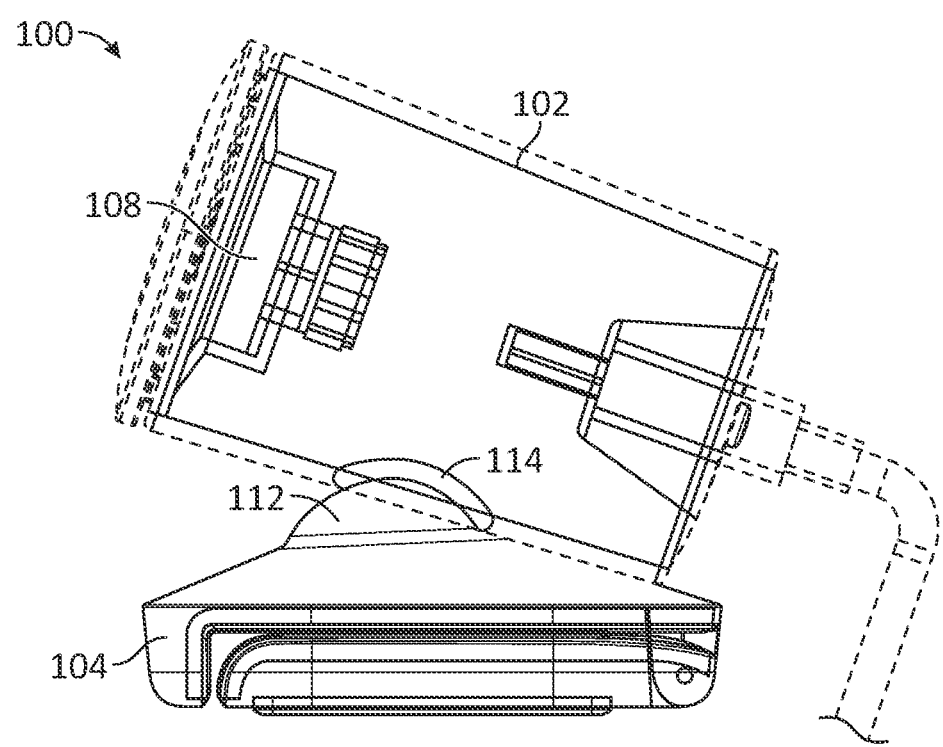
FIG. 14 illustrates the hub tilted upward relative to the mount, with portions of the media system shown transparent for illustration purposes, in accordance with an embodiment of the disclosure.

FIG. 13 illustrates the hub 102 tilted downward relative to the mount 104, with portions of the media system 100 shown transparent for illustration purposes, in accordance with an embodiment of the disclosure. FIG. 14 illustrates the hub 102 tilted upward relative to the mount 104, with portions of the media system 100 shown transparent for illustration purposes, in accordance with an embodiment of the disclosure. Referring to FIGS. 13-14, the complementary shapes of the protrusion 112 and recess 114 may allow the hub 102 to tilt up and down relative to the mount 104 to adjust the field-of-view of the camera 108. For example, the protrusion 112 may include an arcuate shape in cross-section (e.g., circular, ovular, cylindrical, etc.), with the recess 114 shaped to fit at least partially around the protrusion 112. As the hub 102 is tilted up or down, the hub 102 may ride along or about the protrusion 112, such as about an axis defined by the protrusion 112. Depending on the shape of the protrusion 112 and recess 114, the hub 102 may tilt downward up to a 20-degree downward adjustment, as shown in FIG. 13. As shown in FIG. 14, the hub 102 may tilt upward up to a 20-degree upward adjustment, although other configurations are contemplated.

The protrusion 112 and/or recess 114 may be shaped to limit side-to-side rotation of the hub 102 relative to the mount 104. For example, in embodiments where the protrusion 112 and recess 114 include complementary pill-shapes, the hub 102 may tilt up and down about the protrusion 112 but may be limited from rotating side-to-side. As a result, the hub 102 may rotate relative to the mount 104 only about a single axis, as defined along the length of the protrusion 112.

As noted above, the recess 114 may be rubber coated to facilitate holding of the hub 102 as desired. For instance, the rubber coating 548 may provide a friction characteristic sufficient to hold the hub 102 in a desired position relative to the mount 104. For example, the rubber coating 548 may hold the hub 102 in a tilting position, such as tilted upward, tilted downward, or facing straight ahead as set by the user.

Figure 15:
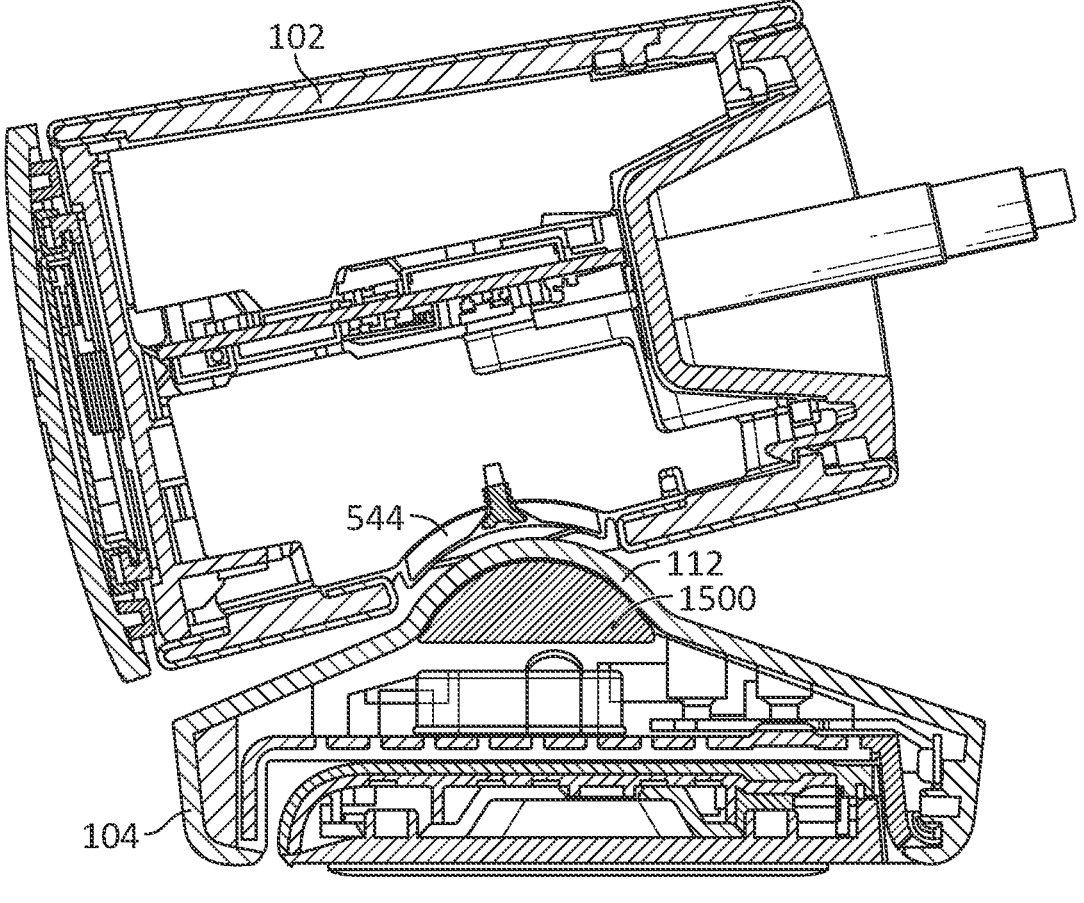
FIG. 15 illustrates a cross-sectional view of the hub and mount, in accordance with an embodiment of the disclosure.

FIG. 15 illustrates across-sectional view of the hub 102 and mount 104, in accordance with an embodiment of the disclosure. As shown in FIG. 15, the mount 104 may include a magnet 1500 configured to magnetically couple the mount 104 to the hub 102 (e.g., magnetically couple to the bracket 544 disposed in the hub 102). The protrusion 112 may house the magnet 1500, such that the magnetic connection between the hub 102 and the mount 104 allows the hub 102 to tilt relative to the mount 104 to adjust the field-of-view of the camera 108, as noted above. As shown, the magnet 1500 may have a bullnose shape in cross-section, although other configurations are contemplated. The bullnose cross-sectional shape may provide a strong connection to the hub 102, while also having a weak connection to other magnetic portions of the mount 104, such as one or more brackets positioned below the magnet 1500. For example, hinging of the mount 104 to an open configuration (e.g., to connect the mount 104 to the top of a TV) may be difficult if the magnet 1500 attracts the hinged portion of the mount 104 too strongly. The bullnose shape may limit this effect.

Figure 16:
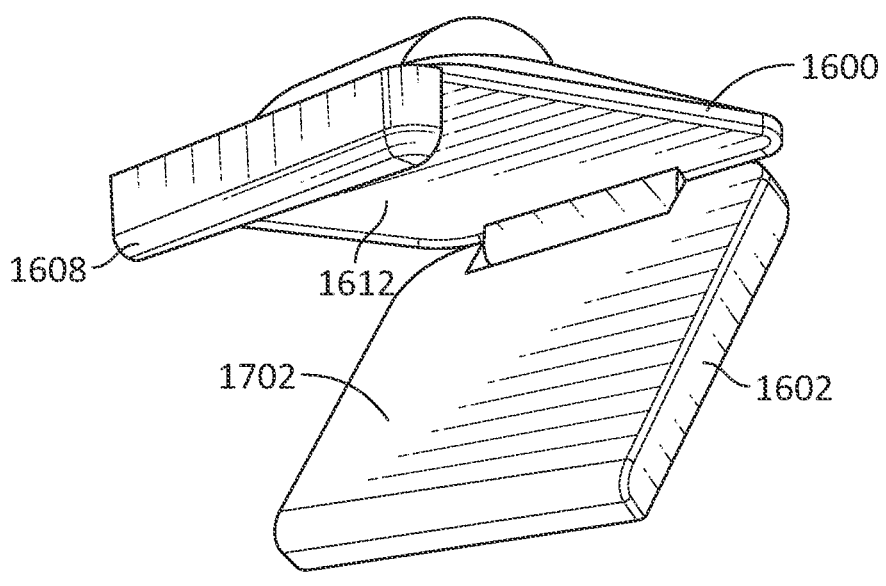
FIG. 16 illustrates a front perspective view of the mount in an open configuration, in accordance with an embodiment of the disclosure.
Figure 17:
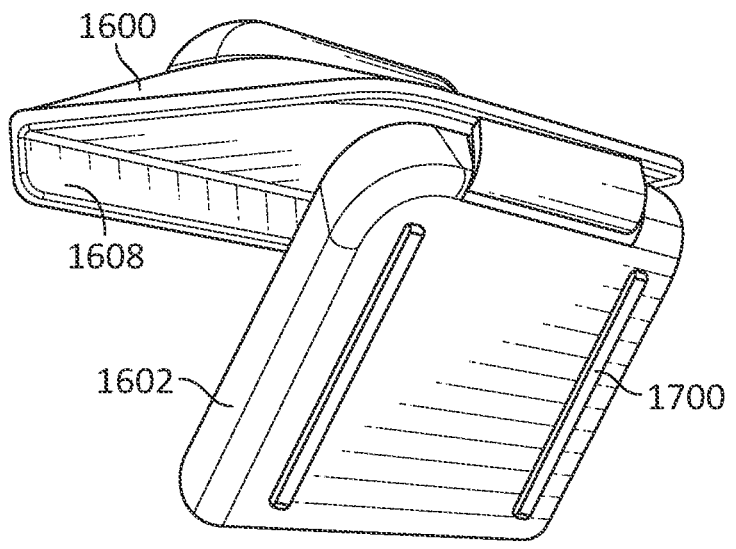
FIG. 17 illustrates a rear perspective view of the mount in the open configuration, in accordance with an embodiment of the disclosure.

FIG. 16 illustrates a front perspective view of the mount 104 in an open configuration, in accordance with an embodiment of the disclosure. FIG. 17 illustrates a rear perspective view of the mount 104 in the open configuration, in accordance with an embodiment of the disclosure. The open configuration may allow the mount 104 to be connected to the top of a TV (e.g., as shown in FIGS. 12A-12B). For example, the mount 104 may be opened to connect portions of the mount 104 to both the top and the rear of the TV to provide the needed support for hub 102.

Referring to FIGS. 16-17, the mount 104 may include a first portion 1600 and a second portion 1602 pivotably connected to the first portion 1600. The first portion 1600, which may be referred to as a base or top portion, may include the protrusion 112 and a lip 1608. In the open configuration of mount 104, the lip 1608 may engage the front of the display device 1200, such as to set the position of mount 104 on the display device 1200 (see, e.g., FIG. 12B). The top portion may include a first grip surface 1612 (e.g., a rubber grip surface) to frictionally engage the top of display device 1200 and hold the mount 104 in position.

The second portion 1602, which may be referred to as an arm or bottom portion, may be hinged to the first portion 160 opposite of the lip 1608. The second portion 1602 may be movable between a first position and a second position relative to the first portion 1600. In the first position, the second portion 1602 may be closed to the first portion 1600 to secure the hub 102 to the tabletop 1100 or other flat surface (see, e.g., FIGS. 11 and 13-15). In the second position, the second portion 1602 may be hinged open from the first portion 1600 to secure the hub 102 to the display device 1200 (see. e.g., FIGS. 12A, 12B, 16, and 17). As shown in FIG. 17, grippy feet 1700 may be disposed on the bottom of the second portion 1602 to facilitate gripping of the mount 104 to the tabletop 1100 or other flat surface. The second portion 1602 may include a second grip surface 1702 (e.g., a rubber grip surface) to frictionally engage the top or back of the display device 1200 and hold the mount 104 in position.

Figure 18:
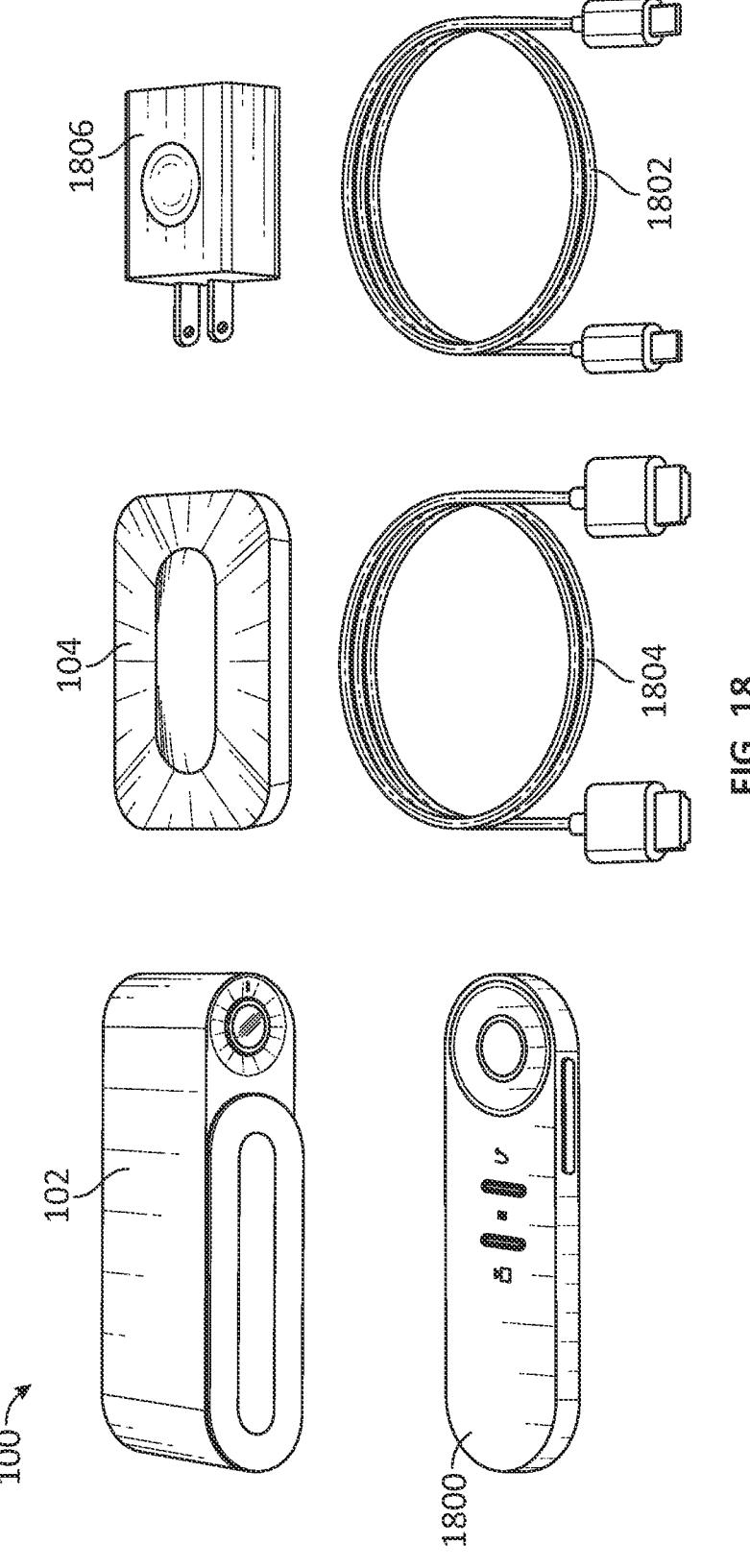
FIG. 18 illustrates various components of the media system, in accordance with an embodiment of the disclosure.

FIG. 18 illustrates various components of the media system 100, in accordance with an embodiment of the disclosure. Referring to FIG. 18, the media system 100 may include a remote 1800 configured to operate the hub 102, a power cord 1802 (e.g., a USB-C cord), a video cable 1804 (e.g., an HDMI cord), and a power adapter 1806. In some embodiments, the media system 100 may include other components, such as one or more adapters (e.g., a USB to USB-C adapter, etc.) and/or exercise devices (e.g., a heart rate monitor, etc.).

FIG. 19 illustrates a top perspective view of the remote 1800, in accordance with an embodiment of the disclosure. FIG. 20A illustrates a bottom perspective view of the remote 1800, in accordance with an embodiment of the disclosure. FIG. 20B illustrates a bottom perspective view of the remote 1800 with a battery door removed for illustration purposes, in accordance with an embodiment of the disclosure. FIG. 21 illustrates a front view of the remote 1800, in accordance with an embodiment of the disclosure. FIG. 22 illustrates a rear view of the remote 1800, in accordance with an embodiment of the disclosure.

Referring to FIG. 19, the remote 1800 may include a silicone overmold 1900, the silicone overmold 1900 defining a top surface 1902 providing seamless buttons (e.g., a navigation button 1908, a select button 1910, a back button 1912, a menu button 1914, and a play/pause button 1916). The seamless buttons may limit moisture ingress. The navigation button 1908 may be provided in a ring surrounding the select button 1910, the navigation button 1908 providing up, down, left, and right selections. The menu button 1914 may be positioned between the back button 1912 and the play/pause button 1916. As shown, the remote 1800 may include a volume rocker 1920 located on the side of the remote 1800. The volume rocker 1920 may be proud of the remote body so that it can be easily located (e.g., during a workout).

In embodiments, the remote 1800 may include one or more "blind" navigation features. For example, the remote 1800 may include debossed slots 1924 between the back, menu, and play/pause buttons 1912, 1914, 1916 (e.g., one debossed slot 1924 between the back and menu buttons 1912, 1914 and another debossed slot 1924 between the menu and play/pause buttons 1914, 1916). The debossed slots 1924 may allow users to locate each button without looking at the remote 1800. At least one of the back button 1912, the menu button 1914, or the play/pause button 1916 may be raised to further facilitate users locating each button without looking at the remote 1800. For example, all three buttons may be raised or only a single button may be raised (e.g., the menu button 1914).

Referring to FIGS. 20A and 20B, the remote 1800 may include a full bottom battery door 2000. The battery door 2000 may include high walls 2002 configured to reduce gaps in the assembly to further limit moisture ingress. As shown in FIG. 20B, the battery door 2000 may be removed from the remote 1800, such as to replace one or more batteries of the remote 1800. Referring to FIG. 21, an 1R transmitter 2100 may be disposed on the front of the remote 1800 to control operation of the display device 1200 and/or an audio device (e.g., to control the volume output on the display device 1200 and/or the audio device). Referring to FIG. 22, an eject button 2200 may be disposed on the rear of the remote 1800. The eject button 2200 may release the battery door 2000 from the remote body (e.g., to release a snap or hook on the battery door 2000). The eject button 2200 may be spring loaded.

Figure 23:
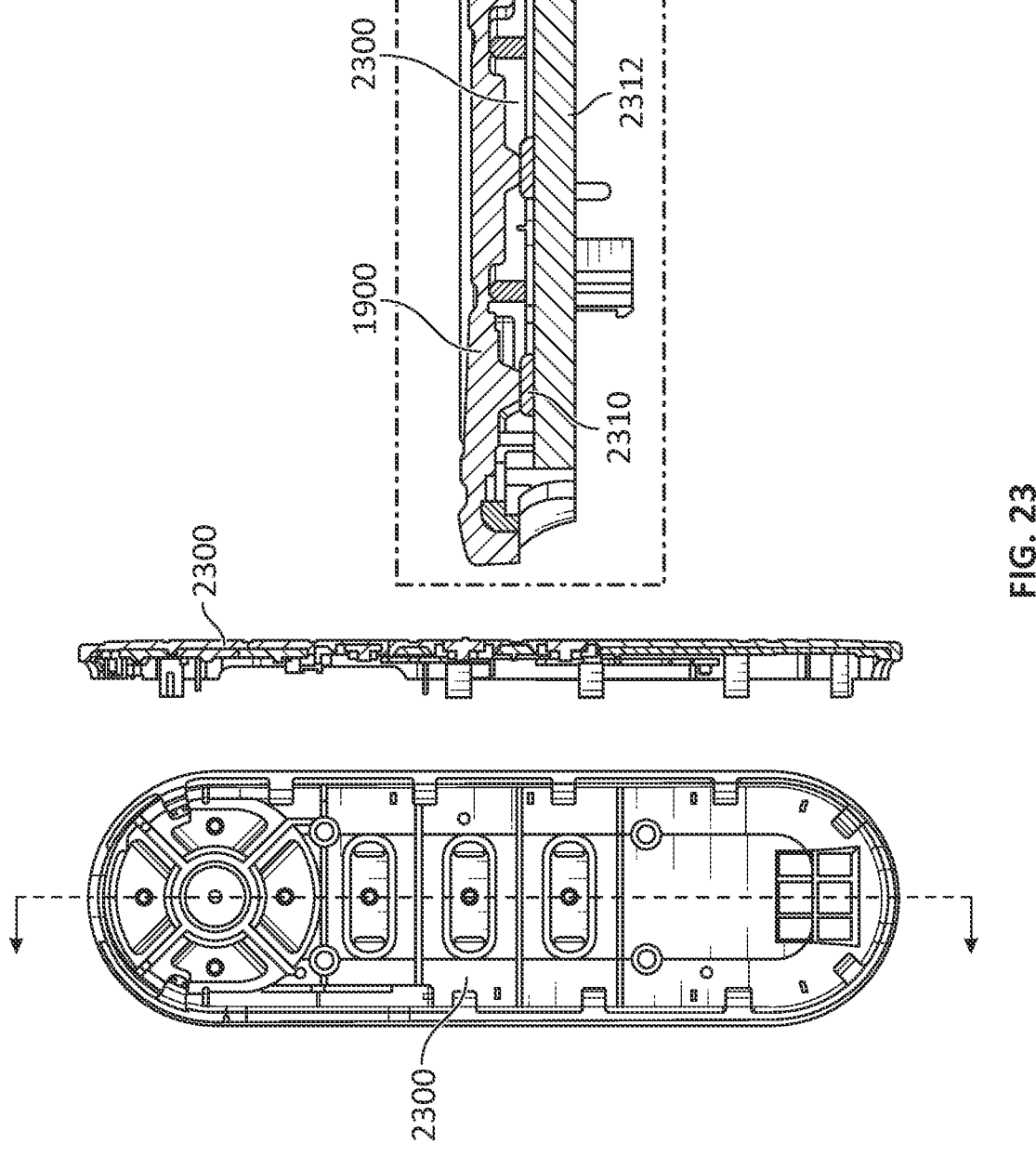
FIG. 23 illustrates a first example of switch actuation of the remote, in accordance with an embodiment of the disclosure.

FIG. 23 illustrates a first example of switch actuation of the remote 1800, in accordance with an embodiment of the disclosure. Referring to FIG. 23, the remote 1800 may include a top cover 2300 positioned beneath the silicone overmold 1900. The top cover 2300 may include a rigid substrate layer 2302 interfacing with the silicone overmold 1900. In such embodiments, the user presses on the silicone overmold 1900, which directly actuates a dome switch 2310 on a PCBA 2312 of the remote 1800.

Figure 24:
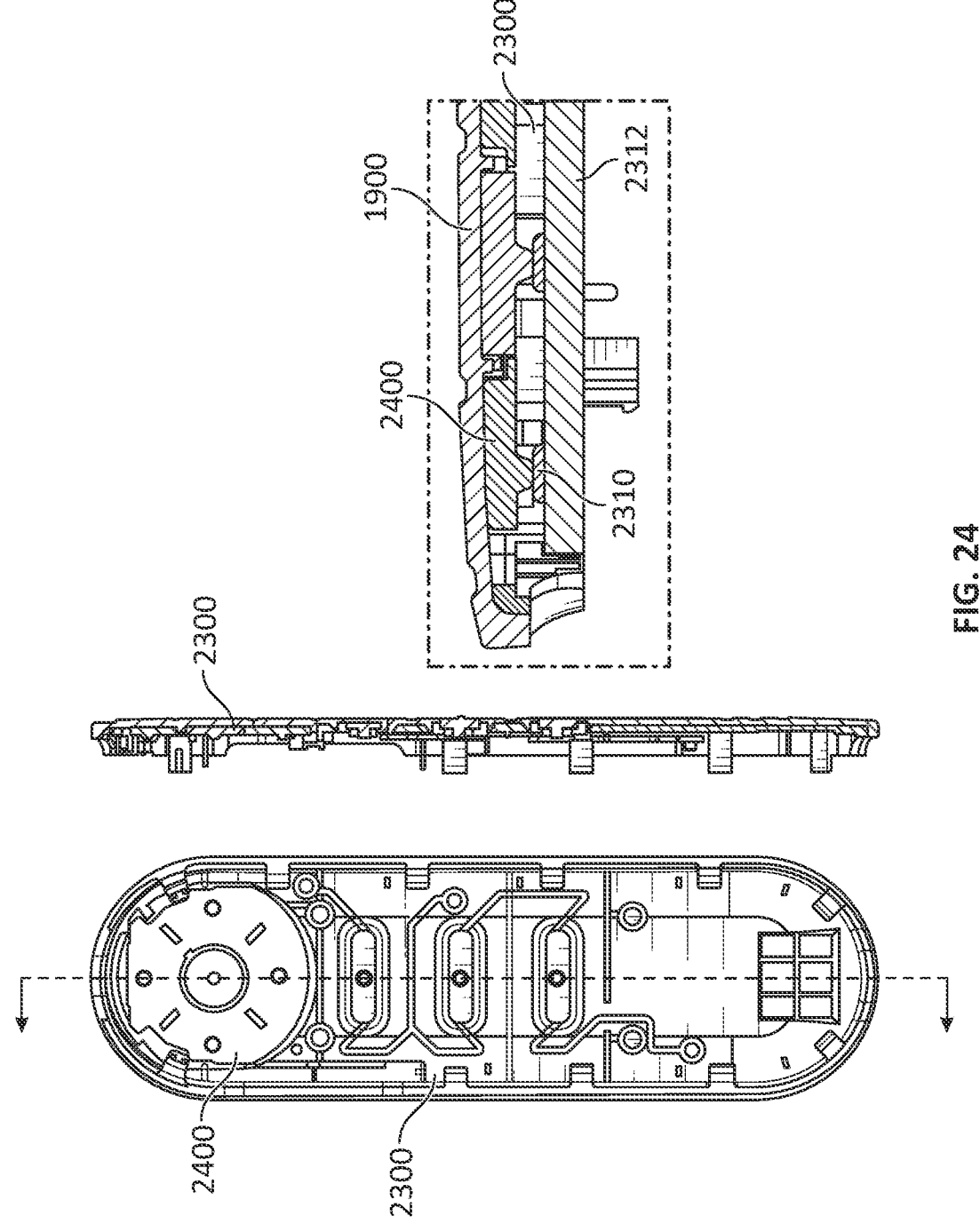
FIG. 24 illustrates a second example of switch actuation of the remote, in accordance with an embodiment of the disclosure.

FIG. 24 illustrates a second example of switch actuation of the remote 1800, in accordance with an embodiment of the disclosure. Referring to FIG. 24, the remote 1800 may include a rigid part 2400 floating between the top cover 2300 and the silicone overmold 1900. In such embodiments, the user presses on the silicone overmold 1900, which in turn pushes the floating rigid part 2400 into the dome switch 2310 on the PCBA 2312 of the remote 1800. FIGS. 23-24 illustrate exemplary embodiments, and the remote 1800 may include other switch actuation configurations.

Figure 25:
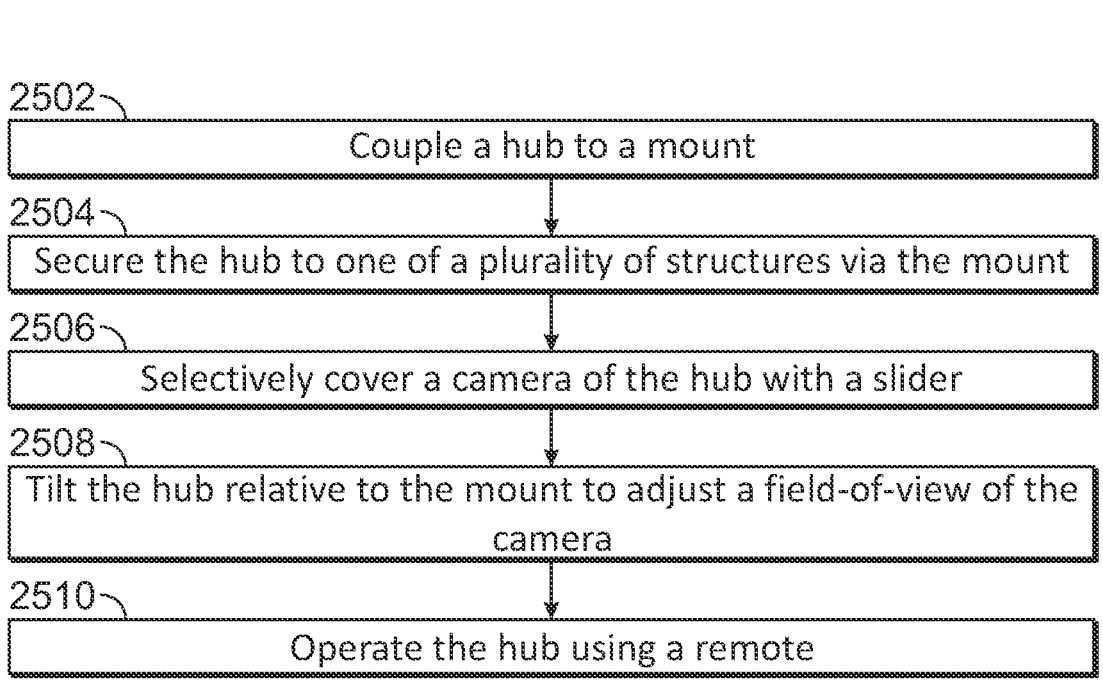
FIG. 25 illustrates a flow diagram of a process of operating a media system, in accordance with an embodiment of the disclosure.

FIG. 25 illustrates a flow diagram of a process 2500 of operating a media system, such as media system 100, in accordance with an embodiment of the disclosure. Any step, sub-step, sub-process, or block of process 2500 may be performed in an order or arrangement different from the embodiments illustrated in FIG. 25. For example, one or more blocks may be omitted from or added to the process 2500. Although process 2500 is described with reference to the embodiments of FIGS. 1-24, process 2500 may be applied to other embodiments.

At block 2502, process 2500 includes coupling a hub to a mount via a magnetic connection. The hub and mount may be similar to hub 102 and mount 104 described above. For instance, the hub may include a camera and may be configured to provide digital content for display on a device. The magnetic connection may allow the hub to tilt relative to the mount to adjust a field-of-view of the camera. For example, the magnetic connection between the hub and mount may allow the hub to tilt upward to point the camera upwards. Similarly, the magnetic connection may allow the hub to tilt downward to point the camera downwards, as described above.

At block 2504, process 2500 includes securing the hub to a structure via the mount. The mount may be reconfigurable to secure the hub to a plurality of structures. For instance, closing a first portion of the mount to a second portion of the mount may configure the mount suitable to secure the hub to a tabletop or other flat surface, as described above. Hinging the second portion open from the first portion of the mount may configure the mount suitable to secure the hub to a display device (e.g., to the top of a TV), as described above.

At block 2506, process 2500 may include selectively covering the camera with a slider of the hub. For example, a slider may be disposed on the front of the hub and configured to slide between a first position exposing the camera, and a second position covering the camera, as described above. The slider may be biased to snap to either the first position or the second position based on the position of the slider. For example, the slider may include a spring (e.g., an over center spring) that biases the slider to either the first position or the second position depending on slider position. The slider may be slid from the first position to the second position until the spring goes "over center," at which point the spring may snap the slider to the second position. Similarly, the slider may be slid from the second position to the first position until the spring again goes "over center." at which point the spring may snap the slider to the first position.

At block 2508, process 2500 may include tilting the hub relative to the mount to adjust the field-of-view of the camera. For example, the hub may be tilted upwards to position a user within the field-of-view of the camera when the hub is positioned low (e.g., on a tabletop). In like manner, the hub may be tilted downwards to position the user within the field-of-view of the camera when the hub is positioned high (e.g., on top of a TV).

At block 2510, process 2500 may include operating the hub using a remote. The remote may be similar to remote, described above. For example, the remote may include one or more navigation buttons, content buttons, and a volume rocker. In embodiments, the remote may be operated "blind," such as the remote including one or more "blind" navigation features allowing users to locate each button without looking at the remote, as described above.

All relative and directional references (including up, down, upper, lower, top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A media system, comprising:
   a hub that streams content for display on a device;
   a camera disposed in the hub; and
   a mount coupled to the hub via a magnetic connection that secures the hub to a structure, the mount including:
   a first portion; and
   a second portion pivotably connected to the first portion and movable between a first position and a second position relative to the first portion,
   wherein, in the first position, the second portion is closed to the first portion to secure the hub to a tabletop or other flat surface,
   wherein, in the second position, the second portion is hinged open from the first portion to secure the hub to the device, and
   wherein the magnetic connection allows the hub to tilt relative to the mount to adjust a field-of-view of the camera.

2. The media system of claim 1, further comprising:
   a thermal architecture that provides a pathway for dissipating heat from one or more heat generating elements of the hub.

3. The media system of claim 2, wherein:
   the thermal architecture is a first thermal architecture configured to dissipate heat generated by the camera;
   the media system further comprises a second thermal architecture configured to provide a second pathway for dissipating heat from one or more circuit boards of the hub; and
   the second thermal architecture is separate from the first thermal architecture to minimize temperature impact between the camera and the one or more circuit boards.

4. The media system of claim 1, wherein the magnetic connection is defined by: the mount comprising a protrusion housing a magnet; and
   the hub comprising a recess configured to receive at least a portion of the protrusion to magnetically couple the hub to the mount.

5. The media system of claim 4, wherein:
   the protrusion and the recess have complementary pill-shapes, the complementary pill-shapes allowing the hub to tilt up and down relative to the mount to adjust the field-of view of the camera;
   the magnet has a bullnose shape in cross-section;
   a fabric is wrapped around top, bottom, and sides of the hub;
   the recess is disposed in the bottom of the hub and interrupts the fabric; and
   the recess is rubber coated to facilitate holding of the hub in a tilting position.

6. The media system of claim 1, wherein the mount includes:
   grippy feet on the bottom of the second portion to facilitate gripping of the mount to the tabletop or other flat surface; and
   one or more grip surfaces on the first and second portions to facilitate gripping of the first and second portions to the device.

7. The media system of claim 1, wherein the hub comprises:
   a slider configured to selectively cover the camera;
   a biasing mechanism comprising an over-center spring biasing the slider to one of a first position covering the camera or a second position exposing the camera based on the position of the slider;

one or more microphones;

a mic switch configured to selectively turn the one or more microphones on or off; and a connector disposed in a rear of the hub and configured to receive one or more cables.

8. The media system of claim 1, further comprising a remote configured to operate the hub, the remote comprising:

a silicone overmolded top surface providing seamless buttons; and a full bottom battery door.

9. A hub configured to provide content for display on a device, the hub comprising:

a camera configured to capture images and/or video of user actions;

a recess configured to receive at least a portion of a mount, the recess shaped to allow tilting of the hub relative to the mount to adjust a field-of-view of the camera;

a bracket positioned adjacent to the recess and configured to interface with a magnet of the mount to magnetically couple the hub to the mount;

a first thermal architecture configured to provide a first pathway for dissipating heat generated by the camera; and a second thermal architecture configured to provide a second pathway for dissipating heat generated by one or more circuit boards of the hub.

10. The hub of claim 9, wherein:

the recess is disposed in a bottom of the hub and has a pill-shape; and the recess is rubber coated to facilitate holding of the hub in a tilting position.

11. The hub of claim 9, further comprising:

a fabric wrapped around top, bottom, and sides of the hub, the recess interrupting the fabric along the bottom of the hub;

one or more microphones;

a mic switch configured to selectively turn the one or more microphones on or off; and a connector well disposed in a rear of the hub and configured to receive one or more cables.

12. The hub of claim 9, further comprising:

a slider configured to selectively cover the camera; and a slider mechanism having an over-center spring snapping the slider to one of a first position or a second position based on the position of the slider, the first position covering the camera, the second position exposing the camera.

13. A method comprising:

coupling a hub to a mount via a magnetic connection, wherein the hub comprises a camera and is configured to provide digital content for display on a device and to capture images and/or video of a user via the camera, and wherein the magnetic connection allows the hub to tilt relative to the mount to adjust a field-of-view of the camera; and securing the hub to a structure via the mount, by:

closing a first portion of the mount to a second portion of the mount to secure the hub to a tabletop or other flat surface; and hinging the second portion open from the first portion to secure the hub to the device, wherein the mount is reconfigurable to secure the hub to a plurality of structures.

14. The method of claim 13, further comprising selectively covering the camera with a slider of the hub.

15. The method of claim 13, further comprising tilting the hub relative to the mount to adjust the field-of-view of the camera.

16. The method of claim 13, further comprising controlling the hub using a remote.

* * * * *